(12) United States Patent
Kuwano et al.

(10) Patent No.: US 8,257,671 B2
(45) Date of Patent: Sep. 4, 2012

(54) METHOD OF LEACHING COPPER SULFIDE ORE

(75) Inventors: Kenichi Kuwano, Hitachi (JP); Atsuko Abe, Hitachi (JP); Manabu Manabe, Hitachi (JP); Akira Miura, Hitachi (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 13/048,695

(22) Filed: Mar. 15, 2011

(65) Prior Publication Data

US 2011/0229385 A1  Sep. 22, 2011

(30) Foreign Application Priority Data

Mar. 17, 2010  (JP) ................................. 2010-060037

(51) Int. Cl.
   *B01D 11/00* (2006.01)

(52) U.S. Cl. ............... 423/24; 423/26; 423/27; 435/262

(58) Field of Classification Search ................... 423/24, 423/26, 27; 435/262
   See application file for complete search history.

(56) References Cited

U.S. PATENT DOCUMENTS

| | | | |
|---|---|---|---|
| 4,483,754 A | 11/1984 | Shiroki | |
| 6,506,935 B1 * | 1/2003 | Kulprathipanja et al. | .... 562/608 |
| 2010/0018349 A1 * | 1/2010 | Manabe | .......................... 75/743 |

FOREIGN PATENT DOCUMENTS

| | | | |
|---|---|---|---|
| JP | 62-34681 B2 | 7/1987 | |
| JP | 4-16554 B2 | 3/1992 | |
| JP | 7-91666 B2 | 10/1995 | |
| JP | 2010-24511 A | 2/2010 | |
| JP | 2011-42858 A | 3/2011 | |
| KR | 2003092751 A | * 12/2003 | |

\* cited by examiner

*Primary Examiner* — Melvin C Mayes
*Assistant Examiner* — Melissa Stalder
(74) *Attorney, Agent, or Firm* — Birch, Stewart, Kolasch & Birch LLP

(57) ABSTRACT

A method of leaching copper sulfide ore includes leaching copper from copper sulfide ore using a sulfuric acid solution comprising iodide ion and iron (III) ion surplus to the iodide ion as a leaching solution; reducing iodine in a solution obtained after the leaching step to less than 1 mg/L by an activated carbon treatment; and oxidizing iron (II) ion or newly added iron (II) ion in a solution obtained after the iodine reduction step by using iron oxidizing microbes to recover iron (III) ion.

7 Claims, 3 Drawing Sheets

METHOD OF LEACHING COPPER SULFIDE ORE

CROSS REFERENCE TO RELATED APPLICATIONS AND INCORPORATION BY REFERENCE

This application is based upon and claims the benefit of priority from the prior Japanese Patent Application No. P2010-060037, filed on Mar. 17, 2010; the entire contents of which are incorporated herein by reference.

BACKGROUND OF THE INVENTION

1. Field of the Invention

The present invention relates to a method of leaching copper from copper sulfide ore using iodide ion wherein iron (III) ion required is efficiently reproduced using iron oxidizing microbes.

2. Description of the Related Art

In general, as forms of leaching copper from copper sulfide ore by wet smelting process, a form of leaching by a batch stirring reaction using sulfuric acid or hydrochloric acid, a form of leaching by preparing a laminate of the ore, providing sulfuric acid or hydrochloric acid to the top of the laminate and recovering the liquid dropped by gravity (heap leaching method) and the like have been known. Further, a method by utilizing the ability of bacteria such as iron oxidizing microbes for leaching the copper efficiently and recovering it (bioleaching) has been also known.

As the wet smelting process of copper sulfide ore, the bioleaching method and the like have been put to practical use for secondary copper sulfide ore such as chalcocite, covelline and the like. However, there is a problem that as the solubility of primary copper sulfide ore such as chalcopyrite to mineral acids is very low, the leaching rate thereof is very low when the leaching is performed at ordinary room temperature.

With regard to the above-described problem, Japanese Patent Application No. 2009-193197 (Patent Document 1) reports an example that the leaching of copper sulfide ore mainly including chalcopyrite and enargite is promoted at ordinary room temperature in the presence of iodide ion together with iron (III) ion as an oxidizing agent. In the leaching, it is also desirable economically to prepare and provide iron (III) ion used as an oxidizing agent by oxidizing iron (II) ion obtained as the result of the leaching reaction and ferrous sulfate which is inexpensive using iron oxidizing microbes. Further, it is also desirable economically and environmentally that the post-leaching solution is reused as a leaching solution repeatedly without discarding it. However, there have been a problem that as iodine has a powerful germicidal action, it is difficult to reproduce iron (III) ion by using the iron oxidizing microbes in above-mentioned leaching utilizing iodine wherein a solution containing iodine and iodide ion is used.

On the other hand, Japanese Examined Patent Application Publication No. 7-91666 (Patent Document 2) reports an example in which active chlorine is used as an oxidizing agent of iodine and activated carbon and anion exchange resin are used as an adsorbent for removing iodine in the solution. As an exemplary method, there is a method for purifying an aqueous solution of alkali metal chloride in which iodide ion is oxidized to molecular iodine by adding hypochlorous acid or chlorine water and then the solution is passed through the activated carbon where the molecular iodine is adsorbed to the activated carbon, and thus, the iodine in the solution is removed. Further, Japanese Examined Patent Application Publication No. 4-16554 (Patent Document 3) also describes a similar method for removing the iodine in the solution by using an oxidizing agent and activated carbon in the industrial method for electrolytic process of common salt. Further, Japanese Patent Application Publication No. 62-34681 (Patent Document 4) reports, as a method for separating and recovering the iodine from brine, a method in which an ion exchange resin is used. However, the solutions used in these examples of the method for removing the iodine are quite different from the acidic leaching solution from copper sulfide ore containing metal ions such as iron, copper and the like, and therefore it is difficult to apply these methods to the leaching as they are. Further, in these methods, chlorine oxidizing agents having strong toxicity against microorganisms are used. Therefore, even if it is possible to remove iodine from the leaching solution of copper sulfide ore by applying these methods as they are, it is difficult to oxidize efficiently iron by microorganisms in the post-iodine removal solution due to the effect of the remaining chlorine oxidizing agent or chloride ion.

As described above, for leaching copper efficiently from copper sulfide ore mainly including chalcopyrite and enargite, iodide ion and iron (III) ion are required. However, there is a problem that it is difficult to reproduce iron (III) ion and circulate the leaching solution by using iron oxidizing microbes due to the germicidal action of iodine.

Accordingly, an object of the present invention is to provide a method of leaching copper from the copper sulfide ore while iron (III) ion is reproduced efficiently by using microorganisms, on the condition that the method has general-purpose properties at real operation level in the leaching in which iodide ion is used.

SUMMARY OF THE INVENTION

The inventors have found that when iron (III) ion is reproduced using iron oxidizing microbes in the leaching of copper from copper sulfide ore mainly including chalcopyrite and enargite, wherein iodine is utilized, reduction of the concentration of iodine to less than 1 mg/L by using an activated carbon allows the removal of the iodine having germicidal action and makes it possible to produce iron (III) ion by iron oxidizing microbes.

An aspect of the present invention inheres in a method of leaching copper sulfide ore encompassing leaching copper from copper sulfide ore using a sulfuric acid solution comprising iodide ion and iron (III) ion surplus to the iodide ion as a leaching solution; reducing iodine in a solution obtained after the leaching step to less than 1 mg/L by an activated carbon treatment; and oxidizing iron (II) ion or newly added iron (II) ion in a solution obtained after the iodine reduction step by using iron oxidizing microbes to recover iron (III) ion.

In one embodiment of the method of the present invention, the method further encompasses mixing an aqueous acidic solution containing the iron (III) ion obtained by the oxidization step and an aqueous solution containing iodine; and using a mixture obtained by the mixing step as the leaching solution for leaching copper from copper sulfide ore.

In another embodiment of the method of the present invention, the method further encompasses recovering iodine in the solution obtained after the leaching step by using an ion exchange resin before the activated carbon treatment.

In still another embodiment of the method of the present invention, the activated carbon treatment is performed in a fluidized bed type reactor and the concentration of the activated carbon in the fluidized bed type reactor is 200-1200 times higher than the concentration of iodine in the solution obtained before the activated carbon treatment.

In still another embodiment of the method of the present invention, the iron oxidizing microbes include *Acidithiobacillus ferrooxidans* and the oxidization step using the iron oxidizing microbes is performed under atmospheric pressure.

Instill another embodiment of the method of the present invention, the iron oxidizing microbes are selected from the group consisting of *Acidithiobacillus ferrooxidans, Acidimicrobium ferrooxidans*, microbes belonging to *Leptosprillum*, microbes belonging to *Ferroplasma*, and microbes belonging to *Acidiplasma*.

Instill another embodiment of the method of the present invention, the method further encompasses preparing the solution obtained after the leaching step to contain a sufficient amount of iron (III) ion for oxidizing the iodide ion in the solution into molecular iodine before the activated carbon treatment.

In still another embodiment of the method of the present invention, the method further encompasses preparing the solution obtained after the leaching step so as to contain a sufficient amount of ion (III) ion for oxidizing the iodide ion in the solution into molecular iodine before recovering the iodide using the ion exchange resin.

According to the embodiments of the present invention, the following matters can be accomplished:

(1) copper may be efficiently leached from copper sulfide ore including chalcopyrite and enargite at room temperature;

(2) An embodiment of the method of the present invention produces iron (III) ion by using iron oxidizing microbes, which is an oxidizing agent required in the leaching process of copper in which a sulfuric acid solution containing iodide ion and iron (III) ion is used as a leaching solution. This can provide a reaction system in which iodine ($I_2$) or triiodo ion ($I^{3-}$), which becomes the catalyst for the melting reaction of copper sulfide ore, is reproduced and always supplied to the reaction system;

(3) A rapid progress of the leaching rate of copper will be possible at low cost and high efficiency;

(4) Separating and recovering the iodine from the solution obtained after the leaching step of copper by using anion exchange resin, and reuse of the solution containing the iodine recovered as a leaching solution may realize the lower cost and higher efficiency; and (5) Further, using anion exchange resin and activated carbon together makes it possible to reduce the amount of activated carbon used and the cost of the system.

DETAILED DESCRIPTION OF THE EMBODIMENT OF THE INVENTION

Figure 1:
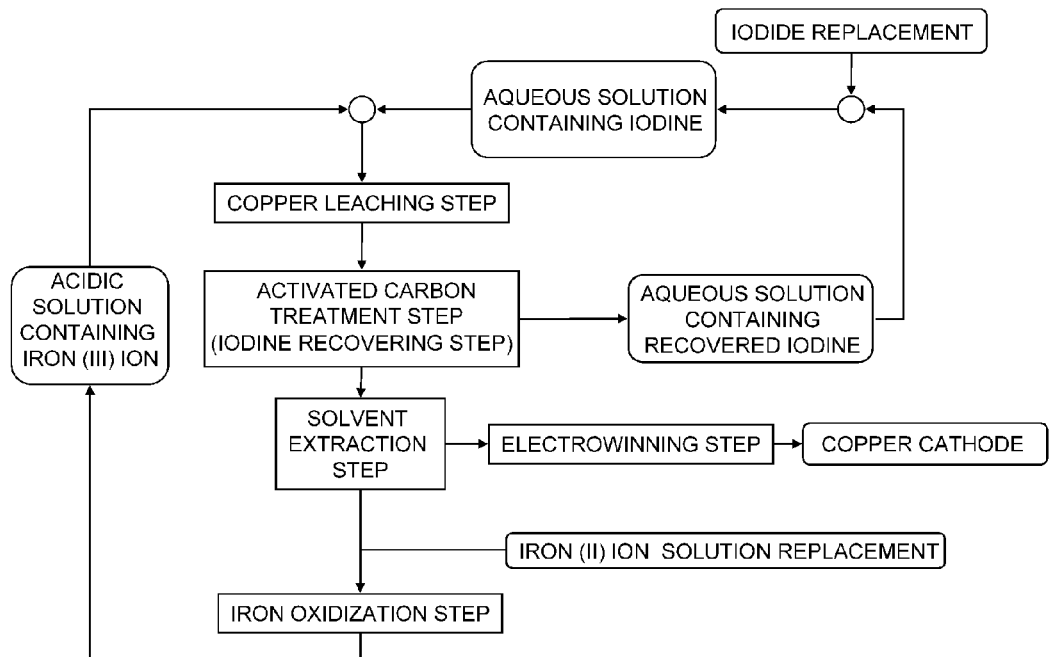
FIG. 1 is a process flow diagram illustrating an example where an activated carbon is used to remove iodine contained in the solution obtained after copper leaching according to an embodiment of the present invention.

An embodiment of the invention will be described in detail hereinafter. However, it will be obvious to those skilled in the art that the present invention may be practiced without such specific details. Various modifications will become possible for those skilled in the art after receiving the teachings of the present disclosure without departing from the scope thereof.

A method according to an embodiment of the present invention is a method of leaching copper sulfide ore which includes leaching copper from copper sulfide ore using a sulfuric acid solution comprising iodide ion and iron (III) ion surplus to the iodide ion as a leaching solution; reducing iodine in a solution obtained after the leaching step to less than 1 mg/L by a treatment with an activated carbon; and oxidizing iron (II) ion or newly added iron (II) ion in a solution obtained after the iodine reduction step by using iron oxidizing microbes such as *Acidithiobacillus ferrooxidans* to recover iron (III) ion. In addition, the method further includes mixing an aqueous acidic solution containing the iron (III) ion obtained by the oxidization step and an aqueous solution containing iodine; and using a mixture obtained by the mixing step as the leaching solution for leaching copper from copper sulfide ore. Further, the method may include a method wherein iodine component in the solution is separated and recovered by an ion exchange resin after the leaching step of copper, and then an aqueous solution containing the iodine recovered and the aqueous acidic solution containing iron (III) ion are mixed, and then the mixture is used as a leaching solution for leaching copper from copper sulfide ore.

Copper sulfide ore including chalcopyrite or enargite, which is an objective ore of the method according to the present invention, may be copper sulfide ore mainly including chalcopyrite or enargite, or copper sulfide ore including chalcopyrite or enargite as a part thereof. The content thereof is not defined particularly. However, it may be preferable to be copper sulfide ore mainly including chalcopyrite or enargite, because the effect of leaching copper by the method according to the present invention may be sufficiently obtained.

The method according to the present invention may be used to any leaching form, provided that it is a wet smelting process of copper using a sulfuric acid solution as a leaching solution. For example, the method may be not only a batch stirring leaching, but also any of heap-leaching or damp-leaching wherein sulfuric acid is scattered over the accumulated ores so that copper is leached into the sulfuric acid. Further, the temperature at the leaching is not particularly defined. The leaching can be carried out at ordinary room temperature, and therefore heating and the like are not required.

It is considered that dissolving and leaching the copper sulfide ore by the method of the present invention proceed by the series of catalytic reactions by iodine indicated in the following (Formula 1) and (Formula 2).

$$2I^- + 2Fe^{3+} > I_2 + 2Fe^{2+} \qquad \text{(Formula 1)}$$

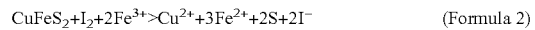

$$CuFeS_2 + I_2 + 2Fe^{3+} > Cu^{2+} + 3Fe^{2+} + 2S + 2I^- \qquad \text{(Formula 2)}$$

It is understood that when both members of (Formula 1) and (Formula 2) are added, and thus iodine components are deleted, the following (Formula 3) is obtained which has been proposed to show the leaching reaction for copper sulfide ore by iron (III) ion as an oxidizing agent.

$$CuFeS_2 + 4Fe^{3+} > Cu^{2+} + 5Fe^{2+} + 2S \qquad \text{(Formula 3)}$$

As shown in (Formula 2), leaching of copper from copper sulfide ore is performed by the reaction catalyzed by iodine ($I_2$). However, the solubility of iodine to water is low. Therefore, the iodide which is easily dissolved in the leaching solution and dissociated to iodide ion ($I^-$) may be added to the leaching solution. As iodide, ones which are water-soluble and produce iodine ion are passable. For example, sodium iodide, potassium iodide, ammonium iodide, hydrogen iodide and the like are available. Further, it is also possible to reuse the iodine, recovered from the post-leached solution using an anion exchange resin, post-oxidation aeration with an oxidizing agent (blowout) or a method for solvent extraction and the like, in the state of solution containing said iodide in various forms of iodine in other form.

First, during the reaction shown in formula (I), iodide ion ($I^-$) added to the leaching solution is oxidized by iron (III) ion ($Fe^{3+}$) to produce iodine ($I_2$). Further, simple substance of iodine ($I_2$) produced in the reaction is reacted with remaining iodide ion ($I^-$), and thus triiodide ion ($I_3^-$) is also produced in the leaching solution. Total concentration of iodine in the leaching solution may be properly decided according to reaction form, type, shape and copper grade of the objective copper sulfide ore and the like. The concentration may be, 100-300 mg/L indicated in Japanese Patent Application Public Disclosure 2010-24511 or 8-100 mg/L indicated in Japanese Patent Application No. 2009-193197, each of which is incorporated herein by reference in its entirety.

As indicated in Formula (3), for leaching of chalcopyrite, provision of the corresponding amount of iron (III) ion as an oxidizing agent is required. For continuous leaching of chalcopyrite, continuous provision of iron (III) iron as an oxidizing agent may be required. However, iodine has a strong toxicity against microbes. Especially, when iron oxidizing microbes are used, iodide ion which does not exhibit the strong toxicity against microbes also oxidized by iron (III) iron generated, and thus converted into iodine ($I_2$) or triiodo ion ($I_3^-$) which has a strong toxicity against microbes. Therefore, we found that it is difficult to produce iron (III) ion by oxidizing iron (II) ion contained in the solution after copper leaching process or iron (II) ion added as ferrous sulfate using leached iron oxidizing microbe when the concentration of iodide ion is equal to 1 ppm or more in the solution. Thus, the present invention removes iodine which exhibits a strong toxicity against iron oxidizing microbe from the solution obtained after the copper leaching process and thus makes it possible to produce iron (III) ion by iron oxidizing microbe.

In the embodiment of the present invention, it may be preferable to remove the iodine which exhibits the toxicity against the microbes from the solution obtained after the copper leaching process, to the total iodine concentration of less than 1 mg/L. The material for removing the iodine is preferably ones which have an ability to absorb the iodine by hydrophobic interaction. Activated carbon having a high specific surface area and the ability to remove the iodine for removing the iodine to less than 1 mg/L is particularly suitable, while solid having a hydrophobic surface other than activated carbon such as coke and/or hydrophobic resin may be used.

While types, raw materials and the like of the activated carbons used in the present invention are not particularly defined, ones which have a large surface area, and is suitable for using in the liquid phase and is stable are preferable. As for the shape thereof, granular one or spherical one is preferable. For example, Yashi Coal Mc provided from Taihei Chemical Industrial Co. Ltd, SHIRASAGI X7000H provided from Japan EnviroChemicals and the like are available. Activated carbons may be charged as a fixed bed or used as fluidized bed. When the activated carbon is provided in the fluidized bed type reactor, it is suitable that the concentration of slurry of activated carbon is 200-1200 times higher than the concentration of iodine in the pre-treated solution which is the solution before the activated carbon treatment. Further, as for iodine adsorbed on the activated carbon, it is also possible to be recovered by treatment with a liquid medicine, heating, combustion and the like, and reused. Further, it is also possible to reuse the used activated carbon by treatment with a liquid medicine, heating and the like.

Further, in the embodiment of the present invention, for reducing the amount of the activated carbon and iodine used, it is preferable to recover and separate the iodine in the solution before the treatment of the activated carbon after copper leaching process. As for the method applied for separating and recovering the iodine, aeration separation (blowout) process used in iodine production from natural brine, anion exchange resin process, extraction with solvent and the like may be used. Among them, the treatment with anion exchange resin may be preferable, because no complex pretreatment and/or addition of expensive oxidizing agent is not required.

As for the anion exchange resin used for separating and recovering the iodine, while ones having anion exchange groups which can adsorb iodide ions are satisfactory to be employed and therefore not particularly defined, ones having a large surface area are preferable, and therefore, for example, Diaion NSA100, SA10A and the like provided form Mitsubishi Chemical are available. For recovering the iodine from these anion exchange resins, for example, the method for recovering the iodine from brine containing iodine indicated in the patent document (Japanese Patent Application Publication No. 62-34681) and the like are available. Further, for connection of the iodine-containing solution and anion exchange resin, any form of a fixed bed, fluidized bed, batch-wise form and continuous form may be available.

Figure 2:
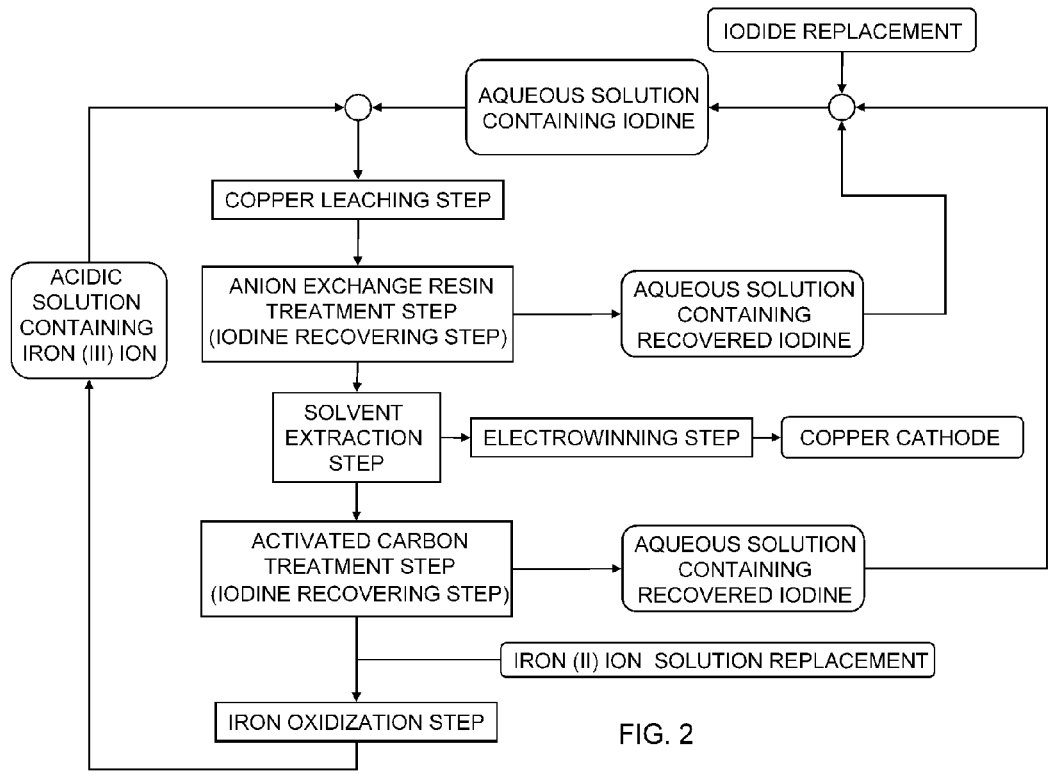
FIG. 2 is a process flow diagram illustrating an example where an anion exchange resin and activated carbon are used to remove iodine contained in the solution obtained after copper leaching according to an embodiment of the present invention.

Further, when copper is recovered from the solution after the copper leaching process, an extraction agent for selectively extracting the copper is generally used, and cementation process is rarely used. These methods can be performed at any step of an anion exchange resin treatment, activated carbon treatment, microbe treatment in the present invention. The process flows according to the present invention, which also include a solvent extraction process are exemplified in FIGS. 1 and 2. FIG. 1 shows an example where an activated carbon merely used to remove iodine. FIG. 2 shows an example where an anion exchange resin and activated carbon are used to remove iodine. The process is not necessarily restricted to a tandem flow as indicated in FIGS. 1 and 2. It is possible to bypass the copper leaching process or iodine recovering process and iron oxidizing process, and set them in parallel. Practically, the most preferable process flow may be applied, considering the effect of the toxicity of iodine to the extraction agent and toxicity of microbes and the like.

As for the iron oxidizing microbes used for regeneration of iron (III) ion from iron (II) ion using the solution after removal of iodine in the present invention, while species are not defined provided that the microbes have an ability of oxidizing iron, concretely, microbes belonging to the genus of *Acidithiobacillus ferrooxidans, Acidimicrobium ferrooxidans*, microbes belonging to *Leptosprillum*, microbes belonging to *Ferroplasma*, or microbes belonging to *Acidiplasma* are available. Among them, *Acidithiobacillus ferrooxidans* may be effective in the present embodiment due to its ability to oxidize the iron at normal temperature and pressure. As one example, *Acidithiobacillus ferrooxidans* FTH6B deposited to National Institute of Technology and Evaluation Patent Microorganisms Depositary, as NITE BP-780 may be used.

As for the temperature and pressure when the iron oxidation reaction occurs, an appropriate condition for each microbe may be used. When the above-described *Acidithiobacillus ferrooxidans* is used, it is preferred to perform under atmospheric pressure at 20-40° C.

When the iodine is recovered with an activated carbon, it is required to adsorb and remove the iodine using a hydrophobic interaction. Therefore, iron (III) ion is required to be in the solution in order to oxidize iodide ion so that the ion is converted into an elemental iodine. As for the required amount of iron (III) in the solution, while it is not particularly defined, preferably, the amount of iron (III) ion which can oxidize iodide ion in the solution to a molecular iodine is desirable. Namely, it is preferable to contain the iron (III) ion more than molar concentration of iodide ion in the solution. More preferably, it is desirable to contain 10 times or more concentration of iron (III) ion than concentration of iodide ion.

Further, as for adsorption of iodine to the ion exchange resin, adsorption in the form of iodine or triiodide ion is preferable, and therefore, it is also desirable to contain iron (III) ion in the solution before the ion exchange resin treatment.

EXAMPLES

The present invention will be explained more concretely by the following Examples. However, the present invention is not defined to them.

Example 1

The Effect of Activated Carbon for Removing Iodine from the Solution After Leaching The effect of iodine to reduce the toxicity of microbes was confirmed in a method of leaching copper from copper sulfide ore using a sulfuric acid solution containing iodide ion and iron (III) ion surplus to the iodide ion as a leaching solution wherein iodine in the solution obtained after the leaching step of copper is reduced to less than 1 mg/L by treatment with an activated carbon, and then iron (II) ion in the solution or newly added iron (II) ion are oxidized by the iron oxidizing microbes to iron (III) ion. As an objective solution, a post-leaching solution obtained by applying said method to a crude ore containing copper sulfide ore yielded at Caserones in Chile was used. Properties of the post-leaching solution were sulfuric acidic pH 1.8, iron (II) ion 0.8/L, iron (III) ion 1.2 g/L, and iodine 0.045 g/L.

50 mL of said leached solution was distributed into 100 mL beakers and then to each of them the below described concentration of activated carbon (Yashi Coal Mc provided from Taihei Chemical Industrial Co. Ltd) was added and stirred for one hour and then filtrated for removing the activated carbon. The concentrations of iodine in the treated solutions A-E were determined with ICP-MS, respectively. The concentrations are shown in Table 1.

TABLE 1

| Treated solution | Activated carbon (g/L) | Activated carbon per iodine conc. in solution (g/g) | Iodine conc. after treatment with activated carbon (mg/L) |
|---|---|---|---|
| A | 0 | 0 | 42 |
| B | 0.1 | 2.2 | 22 |
| C | 1 | 22 | 11 |
| D | 10 | 222 | 0.7 |
| E | 50 | 1111 | 0.5 |

Figure 3:
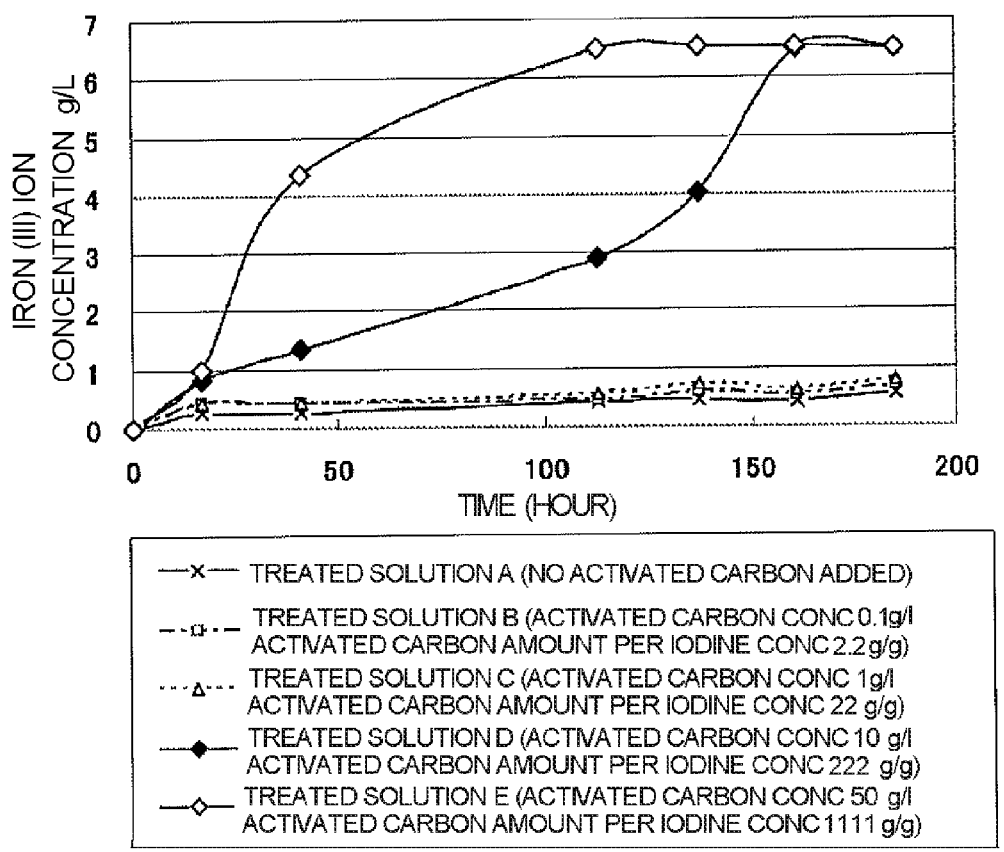
FIG. 3 shows an example of the iodine toxicity reduction effect against microorganisms when an activated carbon treatment with different concentrations is applied according to the embodiment of the present invention.

Subsequently, to the treated solutions A-E, ferrous sulfate (II) hepta-hydrate was added so that they have 6 g/L of iron (II) ion. Then, 25 mL of each solution was transferred to 50 mL flasks, respectively, and then iron oxidizing microbe *Acidithiobacillus ferrooxidans* FTH6B (NITE BP-780) was added so that bacterial concentration becomes $2 \times 10^7$ cells/mL. Each of treated solutions was gently shaken under atmospheric pressure, at 30° C. so that oxidation of iron by iron oxidizing microbe may be promoted. As for the treated solutions A-E after treatment with microbe, concentration of iron (II) ion was determined with oxidation-reduction titration method by potassium dichromate, and total concentration of iron was determined with ICP-AES. Iron (III) ion concentration was calculated as a difference between total iron concentration and iron (II) ion concentration. Changes of iron (III) ion concentration with time are shown in FIG. 3. As a result, when the concentration of activated carbon was adjusted to 222 (activated conc. 10 g/L)-1111 (activated carbon conc. 50 g/L) times the concentration of iodine before activated carbon treatment, iodine conc. in the solution was less than 1 mg/L (see Table 2), and there was no toxicity of iodine, and thus concentration of iron (III) ion was produced by treatment with microbe.

By this Example, it was indicated that when iodine concentration in the post-leaching solution containing iodine is adjusted by treatment with activated carbon less than 1 mg/L, iron (III) ion can be produced by treatment with microbes, and when the solution prepared by mixing the aqueous solution containing the iron (III) ion and aqueous solution containing iodide ion is used for leaching copper sulfide ore, leaching the copper from the copper sulfide ore can be promoted.

Example 2

The Effect of Removing the Iodine from the Post-Leached Solution by Anion Exchange Resin and Activated Carbon 700 mL of the post-leached solution was distributed into 1000 mL beakers, and then passed through the glass column with diameter of 3 cm and 30 cm of height in which 20 g of Diaion NSA100 provided form Mitsubishi Chemical had been charged. Concentration of iodine in the solution after passing through the anion exchange resin was 8 mg/L. To the solutions after passing through the column, below-described concentrations of activated carbons (Yashi Coal Mc provided from Taihei Chemical Industrial Co. Ltd) were added, and stirred for one hour, and then filtrated for removing the activated carbon. Concentrations of iodine in the treated solutions F-K were determined with ICP-MS, respectively. The results are shown in Table 2.

TABLE 2

| Treated solution | Activated carbon (g/L) | Activated carbon per iodine conc. in solution (g/g) | Iodine conc. after treatment with resin and activated carbon (mg/L) |
|---|---|---|---|
| F | 0 | 0 | 8 |
| G | 0.1 | 12.5 | 6 |
| H | 1 | 125 | 2 |
| I | 2.5 | 313 | 0.8 |
| J | 5 | 625 | 0.02 |
| K | 7.5 | 938 | 0.06 |

Figure 4:
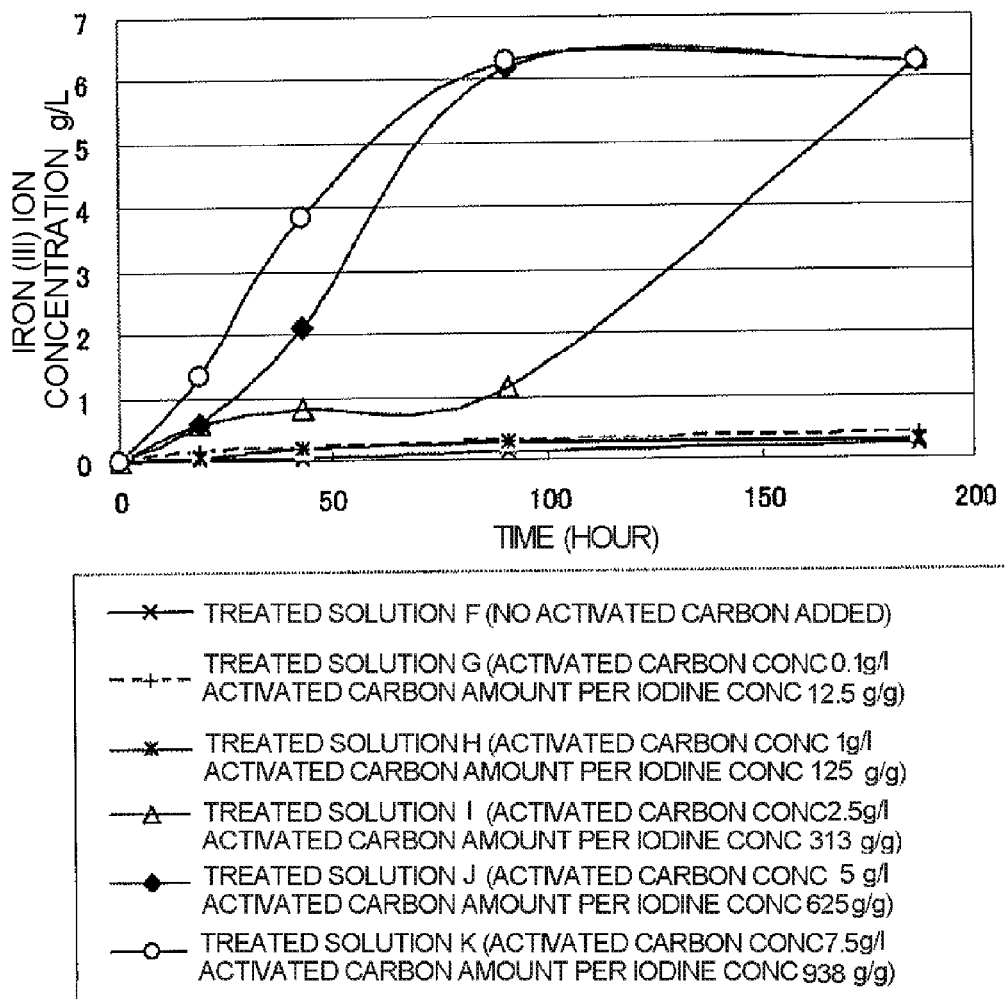
FIG. 4 shows an example of the iodine toxicity reduction effect against microorganisms when an activated carbon treatment with different concentrations is applied after absorbing iodine with anion exchange resin according to the embodiment of the present invention.

To the treated solutions F-K, ferrous sulfate (II) haptahydrate was added so that they have 6 g/L of iron (II) ion. Then, 25 mL of each solution was transferred to 50 mL flasks, respectively, and then iron oxidizing microbe *Acidithiobacillus ferrooxidans* FTH6B (NITE BP-780) was added so that bacterial concentration becomes $2 \times 10^7$ cells/mL. Each of treated solutions was gently shaken under atmospheric pressure, at 30° C. so that oxidation of iron by iron oxidizing microbe may be promoted. As for the treated solutions F-K after treatment with microbe, concentration of iron (II) ion was determined with oxidation-reduction titration method by potassium dichromate, and total concentration of iron was determined with ICP-AES. Iron (III) ion concentration was calculated as a difference between total iron concentration and iron (II) ion concentration. Changes of iron (III) ion concentration with time are shown in FIG. 4.

By the present Example, it is understood that when the iodine is recovered from the post-leaching solution with an anion exchange resin and then the solution is treated with 2.5 g/L or more of activated carbon (which is 313 times or more the concentration of iodine in the solution before the treatment with activated carbon), concentration of iodine is reduced less than 1 mg/L (see Table 2), and therefore, iron (II) ion in the post-treated solution can be oxidized by iron oxidizing microbes into iron (III) ion. Further, when compared with (Example 1), it is understood that when anion exchange resin is used together, the concentration of activated carbon which is required for reducing the iodine concentration less than 1 mg/L can be reduced to one fourth, namely from 10 g/L to 2.5 g/L. When the solution prepared by mixing the aqueous solution containing the iron (III) ion and aqueous solution containing iodide ion is used for leaching copper sulfide ore, leaching the copper from the copper sulfide ore can be promoted.

What is claimed is:

1. A method of leaching copper sulfide ore comprising:
    a copper leaching step of leaching copper from copper sulfide ore using a sulfuric acid solution comprising iodide ion and iron (III) ion surplus to the iodide ion as a leaching solution;
    a copper recovering step of recovering copper from the solution after the copper leaching step; and
    an iron oxidizing step of oxidizing iron (II) ion in a solution obtained after the copper recovering step to iron (III) ion, by using iron oxidizing microbes,
    wherein the method further comprises:
    an iodine removing step of reducing iodine in a solution obtained after the leaching step to less than 1 mg/L by an activated carbon treatment, before the iron oxidizing step, and before or after the copper recovering step;
    an iodine recovering step of recovering iodine removed in the iodine removing step; and
    a mixing step of mixing an aqueous acidic solution containing iron (III) ion obtained in the iron oxidizing step and an aqueous solution containing iodine obtained in the iodine recovering step,
    wherein a solution obtained in the mixing step is used as the leaching solution for leaching copper from copper sulfide ore in the copper leaching step.

2. The method of claim 1, further comprising recovering iodine in the solution obtained after the leaching step by using an ion exchange resin before the activated carbon treatment.

3. The method of claim 2, further comprising preparing the solution obtained after the leaching step to contain a sufficient amount of iron (III) ion for oxidizing the iodide ion in the solution into molecular iodine before recovering iodine in the solution using the ion exchange resin.

4. The method of claim 1, wherein the activated carbon treatment is performed in a fluidized bed type reactor and the concentration of the activated carbon in the fluidized bed type reactor is 200-1200 times higher than the concentration of iodine in the solution before the activated carbon treatment.

5. The method of claim 1, wherein the iron oxidizing microbes include *Acidithiobacillus ferrooxidans* and the oxidization step using the iron oxidizing microbes is performed under atmospheric pressure.

6. The method of claim 1, wherein the iron oxidizing microbes are selected from the group consisting of *Acidithiobacillus ferrooxidans*, *Acidimicrobium ferrooxidans*, microbes belonging to *Leptosprillum*, microbes belonging to *Ferroplasma*, and microbes belonging to *Acidiplasma*.

7. The method of claim 1, further comprising preparing the solution obtained after the leaching step to contain a sufficient amount of iron (III) ion for oxidizing the iodide ion in the solution into molecular iodine before the activated carbon treatment.

* * * * *